UNITED STATES PATENT OFFICE.

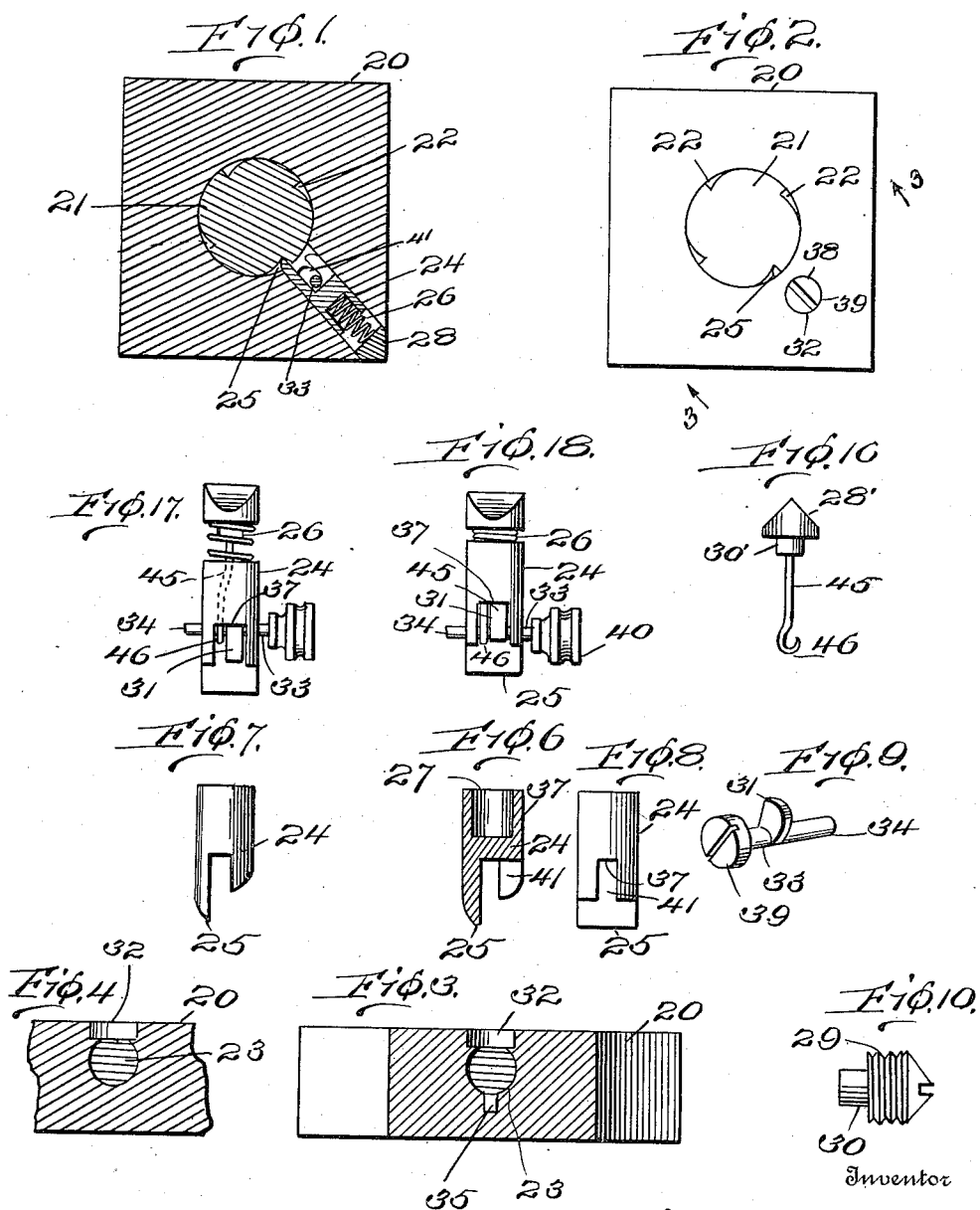

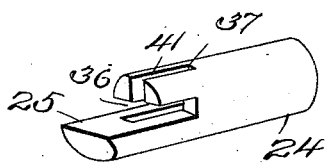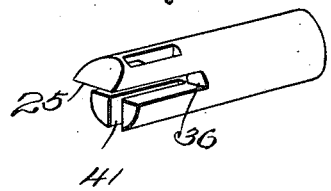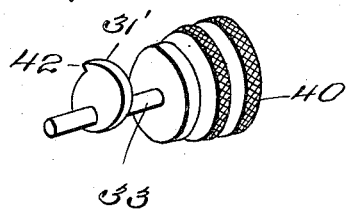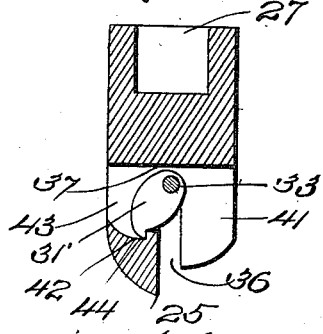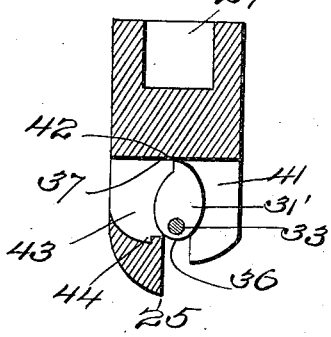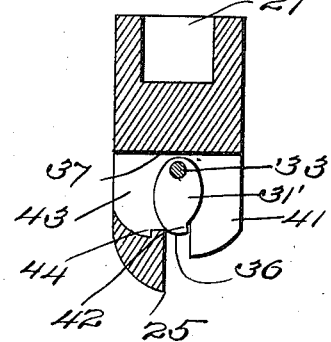

JOSIAH H. HARVEY, OF SCRANTON, PENNSYLVANIA.

NUT-LOCK.

1,013,550.  Specification of Letters Patent.  Patented Jan. 2, 1912.

Application filed May 25, 1910. Serial No. 563,311.

*To all whom it may concern:*

Be it known that I, JOSIAH H. HARVEY, a citizen of the United States, residing at Scranton, in the county of Lackawanna and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for an object to provide a nut with improved ratchet mechanism for engaging with kerfs formed in the threaded portions of the bolt.

A further object of the invention is to provide a nut having a socket formed therein radially and preferably extending from one corner of the nut, and with an improved pawl located within the socket extending within the bore of the nut in position to engage with the kerf of the bolt.

A further object of the invention is to provide in combination with a nut having an engaging pawl, of means disposed upon the surface of the nut for removing the pawl from such engagement.

A further object of the invention is to provide a pawl engaging means with such means that the pawl may be locked immovable in engaging position.

With these and other objects in view the invention comprises certain novel constructions, combinations and arrangements of parts as will be hereinafter more fully described and claimed.

In the drawings: Figure 1 is a view of the nut taken on a section at right angles to the axis of the bolt, and showing also in section the pawl and pawl operating means. Fig. 2 is a top plan view of the nut and end elevation of the bolt showing the pawl manipulating means. Fig. 3 is a sectional view of the nut taken on line 3—3 of Fig. 2. Fig. 4 is a sectional view similar to that shown at Fig. 3 but with the socket formed in a slightly different manner. Fig. 5 is an enlarged perspective view of the pawl. Fig. 6 is a view of the pawl in longitudinal diametrical section. Fig. 7 is a view in elevation. Fig. 8 is a view in side elevation of the pawl as seen from the top at Fig. 5. Fig. 9 is a view of the pawl releasing eccentric and eccentric operating means. Fig. 10 is a view of the plug for the socket shown at such figure as screw-threaded, the preferred form, however, being driven instead of threaded. Fig. 11 is a perspective view of a modified form of pawl. Fig. 12 is a perspective view of the lock releasing eccentric and eccentric operating means for use in conjunction with the pawl shown at Fig. 11, and whereby the pawl may be positively locked to seat. Fig. 13 is a sectional view of the pawl shown at Fig. 11 and the pawl operating means shown at Fig. 12 positioned to permit resilient action of the pawl. Fig. 14 is a sectional view of the pawl, and a view of the pawl operating means with the eccentric turned to throw the pawl out of engagement with the bolt. Fig. 15 is a longitudinal sectional view of the pawl with the eccentric turned to lock the pawl positively in engagement with the bolt. Fig. 16 is a view in side elevation of the modified form of plug showing means for locking the plug to seat. Fig. 17 is a view in side elevation of the plug shown at Fig. 16 with the pawl and pawl operating means connected therewith in operative relation with the pawl thrown outwardly. Fig. 18 is a view in side elevation similar to the figure shown at Fig. 17 with the pawl retracted.

Like characters of reference designate like parts throughout the several views.

At Figs. 1, 2, 3 and 4 a nut is shown at 20 which may be of any form being shown square simply as a matter of convenience of illustration. The nut is provided with the usual threaded opening to receive the bolt 21, which said bolt is provided about its threaded periphery with longitudinal groove or grooves 22, such grooves being shown at Figs. 1 and 2 as having one side reduced on the radius of the bolt, and the other side at an inclination, such form of groove being preferred but not essential to the present invention, any usual and ordinary form of groove being satisfactorily employed.

Radially of the bolt and preferably extending from one corner, although not necessarily so, is a socket 23 communicating with the interior bore of the nut, and with a slotted pawl member shown as a whole at 24 seated therein and provided with a nose or extremity 25 proportioned and positioned to engage within the grooves 22 of the bolt.

The slots of the pawl extend at an angle with each other, forming a plurality of longitudinally extending fingers as shown in Figs. 6-8, etc.

To hold the pawl yieldingly to seat a spring 26 is provided bearing against such pawl and preferably, though not necessarily, seated within a recess 27 formed axially of such pawl. To maintain the spring in position a plug 28 is inserted in the bore 23 preferably by forming such plug slightly tapered and driving into the socket, and also such plug may be made screw-threaded as shown at 29 in Fig. 10, and provided with a stud 30 for positioning the spring, although the stud is not essential to the operation of the device.

To release the pawl from engagement an eccentric 31 is mounted within the socket 23 by means of a cross socket 32 and is carried upon a spindle 33 which is preferably continued as at 34 beyond the eccentric 31, and is seated in a bearing socket 35 formed as an axial continuation of the socket 32. The spindle, consisting of the parts 33 and 34, is inserted through the cut 36 of the pawl 24 so positioned that the eccentric 31 is capable of bearing against the abutment 37 of the pawl, and to retract the pawl against the tension of spring 26 when the spindle 33 is rotated. To facilitate the rotation of the spindle 33 and eccentric 31, a head 38 is provided with a nick 39 for the receipt of a screw driver or other implement, or a knurled head 40 is provided thereon so that the said eccentric may be rotated. Opposite the engaging nose 25 the body of the pawl is slotted as at 41 to permit the eccentric to rotate therethrough.

It will therefore be apparent that with the parts associated as shown at Fig. 1 the pawl 24 is held yieldingly to seat by the spring 26, and if the bolt is provided with slots having one inclined side the nut may be rotated on the bolt, the pawl yieldingly passing over the groove in the action of screwing the nut home, but thrown resiliently outward to engage the straight side of the groove when an attempt is made to unscrew the nut. Of course, when a nut is employed having other than inclined sides, the pawl will be thrown out of engagement while the nut is being screwed home, and thrown into engagement after the nut is seated.

At times it is found desirable to lock the pawl to seat. For such purpose the eccentric 31' is provided with a nose 42, and a cut 43 formed in the pawl is provided with a stop or shoulder 44 against which the nose engages when the eccentric is completely rotated, and the pawl thereby held at the outward limit of its movement so that it cannot be displaced except by rotating the eccentric. To prevent also the displacing of the plug, the same may be shown as at 28' at Fig. 16 having a shank 45 with a hooked extremity 46 adapted to hook about the spindle 34 so that the plug is held in position by the spindle, and the spindle also held in position by the plug. It is not usually found necessary, however, to employ the plug with the spindle and hooked extremity, but a plug properly proportioned and shaped and driven into the socket will be found thoroughly reliable in most instances. Whatever the form, the plug is intended to maintain the spring 26 in operative relation with the pawl, and an eccentric adapted to manipulate the pawl to throw it out of engagement with the bolt, or in certain modifications to also lock it into positive engagement with the bolt.

What I claim is:

1. In a device of the character described, the combination with a bolt having notches therein, of a nut therefor having a central opening for receiving said bolt, and a bore extending from said central opening, a reciprocating pawl slidably mounted in said bore and arranged to engage said bolt in said notches when in an outer position, such pawl comprising a member provided with a plurality of slots forming fingers projecting from the end thereof, one of such fingers being elongated and constituting the tooth of the pawl, a spindle mounted in the nut at substantially right angles to the direction of movement of the pawl and extending through one of the slots aforesaid, a cam carried by the spindle and located in the other slot, for engaging and operating the pawl.

2. In a device of the character described, the combination with a bolt having notches therein, of a nut therefor having a central opening for receiving the bolt and a bore extending from said central opening, a reciprocating pawl slidably mounted in said bore and arranged to engage the bolt in said notches when in an outer position, such pawl comprising a member provided with a plurality of slots intersecting along the central longitudinal axis of the pawl forming fingers projecting from the end thereof, one of such fingers being elongated and constituting the tooth of the pawl, an operating device interlocking with the pawl within the body of the latter and comprising a spindle mounted in the nut at substantially right angles to the direction of movement of the pawl and extending through one of the slots aforesaid, and a cam carried by the spindle and located in the other slot, for engaging and operating the pawl.

3. A nut provided with a central opening and a radial bore, a pawl slidably mounted in the bore, itself being provided with a bore throughout its length, a plug for the outer end of the bore of the nut, a spring disposed between the plug and the pawl, and adapted to hold the pawl normally extended, a spindle passing through the pawl, an eccentric carried by the spindle and adapted when rotated to move the pawl, and means connecting the plug to the spindle and passing through the bore of the pawl.

In testimony whereof I affix my signature in presence of two witnesses.

JOSIAH H. HARVEY.

Witnesses:
  JOHN L. FLETCHER,
  L. L. MORRILL.

Copies of this patent may be obtained for five cents each, by addressing the "Commissioner of Patents, Washington, D. C."